(No Model.)
J. S. CANTELO.
DRAWING KNIFE.
No. 290,396. Patented Dec. 18, 1883.
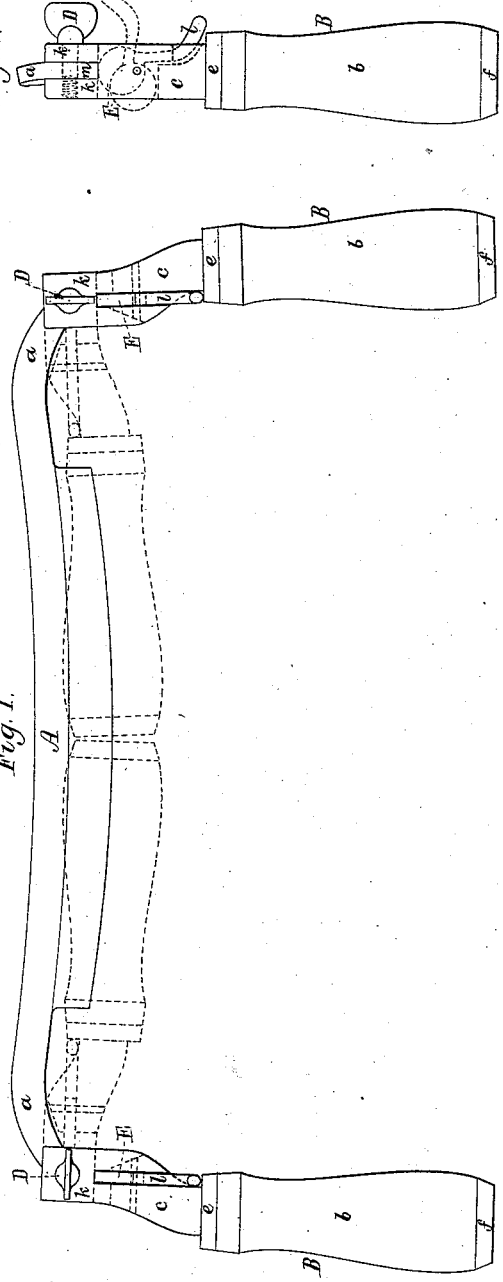
Witnesses.
S. N. Piper
E. A. Pratt
Inventor
John Solomon Cantelo
by R. H. Eddy atty.

UNITED STATES PATENT OFFICE.

JOHN SOLOMON CANTELO, OF BOSTON, MASSACHUSETTS.

DRAWING-KNIFE.

SPECIFICATION forming part of Letters Patent No. 290,396, dated December 18, 1883.

Application filed September 29, 1883. (No model.)

*To all whom it may concern:*

Be it known that I, JOHN S. CANTELO, of Boston, in the county of Suffolk, of the Commonwealth of Massachusetts, have invented a new and useful Improvement in Drawing-Knives; and I do hereby declare the same to be described in the following specification and represented in the accompanying drawings, of which—

Figure 1 is a side elevation, and Fig. 2 an end view, of a drawing-knife provided with my invention, the nature of which is defined in the claims hereinafter presented. Fig. 3 is an inner side view, Fig. 4 a transverse section, and Fig. 5 a longitudinal section, of one of the handles of such knife. Fig. 6 is a perspective view of the upper ferrule or cap, and Fig. 7 is a similar view of the lower ferrule or cap, of the wooden body of the handle, these figures showing the interior of each ferrule or cap. Fig. 8 is a top view of the upper ferrule or cap, while Fig. 9 is a bottom view of the lower one; and Fig. 10 is a side view of the blade, showing the prismatic heads of its arms.

The said drawing-knife has its two handles slotted lengthwise and pivoted to the arms of its blade in a manner to enable each of such handles to be turned into an angle with the blade or up to the cutting-edge thereof, to receive it as the handle of a pen-knife can close upon and receive its blade.

My invention is an improvement in drawing-knives of this class.

In the drawings, A denotes the blade, $a\,a$ its two arms, and B B its handles. Each of such handles is mainly composed of a wooden body, $b$, and a metallic hinge-piece, $c$, the wooden body being grooved lengthwise of it, as shown at $d$, to receive the blade. At each of its ends the said body has a metallic ferrule or cap to fit to and encompass it. These ferrules or caps are shown at $e$ and $f$, each being a cup having two lips, $g$, arranged within it, as represented, such lips being to enter and fit the groove $d$ of the body $b$ in a manner to prevent such groove from contracting laterally. Furthermore, there is through each ferrule or cap two holes, $h$, to receive the two shanks $i\,i$, projecting, as shown, from the metallic hinge-piece $c$. These shanks go through the handle-body lengthwise thereof, and also through its caps $e$ and $f$, the blade-receiving groove of the handle being between the said two shanks. At their lower ends the shanks are "upset" against the lower cap. Each hinge-piece $c$ is furcated to receive the arm of the blade. A clamp-screw, D, goes through one of the two lips $k\,k$ of the furcation, and also through the said arm, and screws into the other lip. This screw serves not only to connect the handle to the blade-arm, but to contract the lips or draw them into close contact with it, as the rubbing surfaces of the joint may become worn or apart, as occasion may require. There is in each hinge-piece $c$ a locking-eccentric, E, provided with a handle, $l$, the whole being as shown in Figs. 1 and 2. On revolving the eccentric, so as to cause its periphery to bear against one of the sides of the prismatic pivotal head $m$ of the arm of the blade, the handle will be locked relatively to the blade, whether such handle may be turned up to the blade or into a right angle therewith. It will be seen by the drawings that each prismatic head $m$ is square, or substantially so.

In the drawing-knife provided with two handles pivoted to the blade and grooved to receive it, as described, I claim—

1. The furcated hinge-piece $c$, provided with the two shanks $i$, extended from it, as represented.

2. The hinge-piece $c$, provided with the two shanks $i$, projecting from it, as represented, in combination with the body of the handle grooved lengthwise to receive the blade, and having the said shanks extended through it, (the said body,) and arranged with the groove between them, substantially as set forth.

3. Each metallic ferrule or cap of the handle provided with holes for reception of the shanks $i$, and also with the lips to enter the groove of the body at one end thereof, substantially and for the purpose as specified.

4. Each blade-arm provided with a prismatic head, as described, and pivoted to the handle, in combination with the locking-eccentric applied to such handle and adapted to operate with the said head, essentially as set forth.

JOHN SOLOMON CANTELO.

Witnesses:
 R. H. EDDY,
 E. B. PRATT.